United States Patent
Nayak et al.

(10) Patent No.: US 9,866,923 B2
(45) Date of Patent: Jan. 9, 2018

(54) DIGITAL CHANNEL INTEGRATION SYSTEM

(71) Applicant: CBS Interactive Inc., San Francisco, CA (US)

(72) Inventors: Ashutosh Nayak, Clifton, NJ (US); Cristyan Nevers, Bronx, NY (US); Robert Accettura, Jersey City, NJ (US)

(73) Assignee: CBS Interactive Inc., San Francisco, CA (US)

( * ) Notice: Subject to any disclaimer, the term of this patent is extended or adjusted under 35 U.S.C. 154(b) by 12 days.

(21) Appl. No.: 14/839,828

(22) Filed: Aug. 28, 2015

(65) Prior Publication Data

US 2017/0064413 A1 Mar. 2, 2017

(51) Int. Cl.
| H04N 7/10 | (2006.01) |
| H04N 21/81 | (2011.01) |
| H04N 21/234 | (2011.01) |
| H04N 21/84 | (2011.01) |
| H04N 21/845 | (2011.01) |
| H04N 21/858 | (2011.01) |

(52) U.S. Cl.
CPC ... *H04N 21/8133* (2013.01); *H04N 21/23424* (2013.01); *H04N 21/812* (2013.01); *H04N 21/84* (2013.01); *H04N 21/8455* (2013.01); *H04N 21/8586* (2013.01)

(58) Field of Classification Search
CPC ........... H04N 21/8133; H04N 21/2187; H04N 21/23424; H04N 21/2408; H04N 21/44016; H04N 21/6125; H04N 21/643; H04N 21/812; H04N 21/8352; H04N 21/84; H04N 21/8455; H04N 21/8456; H04N 21/8541; H04N 21/8586; G06F 17/03; G06F 17/30

USPC .......................................................... 725/32
See application file for complete search history.

(56) References Cited

U.S. PATENT DOCUMENTS

| 8,978,075 | B1 * | 3/2015 | Kaiser .................... H04N 5/44 725/105 |
| 2002/0108115 | A1 * | 8/2002 | Palmer .................. H04N 7/165 725/50 |
| 2008/0036917 | A1 * | 2/2008 | Pascarella ............... G11B 27/11 348/702 |
| 2008/0163379 | A1 * | 7/2008 | Robinson ........... G06Q 30/0222 726/27 |
| 2012/0197419 | A1 * | 8/2012 | Dhruv ................ H04N 21/6543 700/94 |

(Continued)

FOREIGN PATENT DOCUMENTS

WO WO 2010078281 A2 * 7/2010 ......... H04L 65/1069

OTHER PUBLICATIONS

Internet Archive Waybackmachine, Crispin NewsPlay, https://web.archive.org/web/20130928031828/http://www.enps.com/partner_systems/31/ crispin_newsplay, Sep. 28, 2013, p. 1-3 (hereafter CrispinNewsPlay).*

*Primary Examiner* — Nathan Flynn
*Assistant Examiner* — Alfonso Castro
(74) *Attorney, Agent, or Firm* — Fenwick & West LLP

(57) ABSTRACT

Systems and methods are disclosed for generating links to points in a video stream corresponding to actual programming events of a show playing, played, or about to be played in the live video stream, improving the utility of streaming by enabling viewers to view information specifically related to a story and easily navigate to the start of the story within the video stream.

18 Claims, 6 Drawing Sheets

(56) References Cited

U.S. PATENT DOCUMENTS

2015/0067723 A1* 3/2015 Bloch ................. H04N 21/812
                                                    725/32
2015/0100999 A1* 4/2015 McKenna .......... H04N 21/4307
                                                    725/116

* cited by examiner

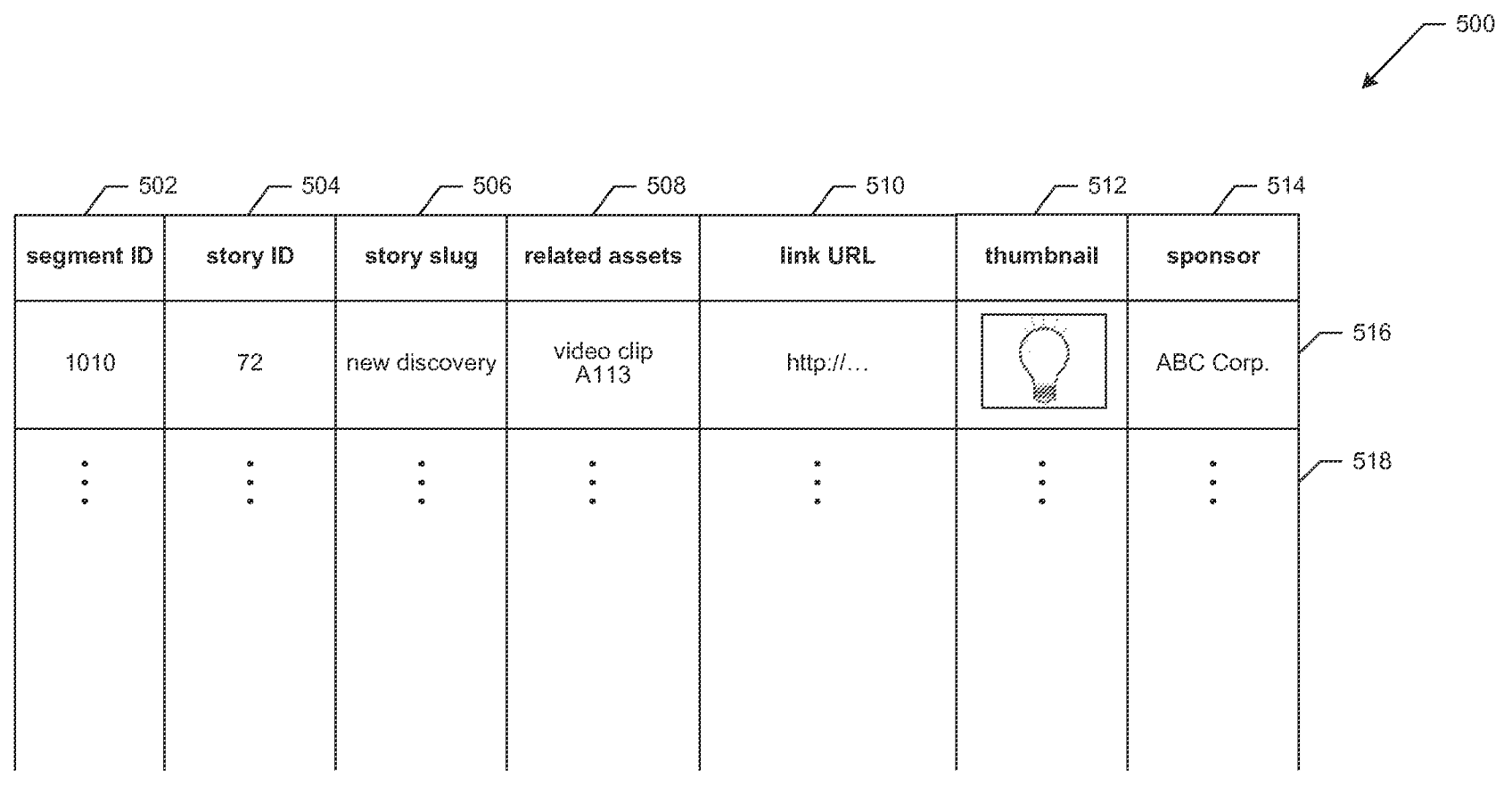

| segment ID | story ID | story slug | related assets | link URL | thumbnail | sponsor |
|---|---|---|---|---|---|---|
| 1010 | 72 | new discovery | video clip A113 | http://... | (lightbulb image) | ABC Corp. |
| ... | ... | ... | ... | ... | ... | ... |

FIG. 5

DIGITAL CHANNEL INTEGRATION SYSTEM

TECHNICAL FIELD

The present disclosure relates to providing streaming video, such as a live Internet stream of broadcast television programming.

BACKGROUND

Television stations produce and play various types of programming. Entertainment shows may be pre-scripted and produced well ahead of airing, while current news programs may constantly shift the rundown of stories to air right up to the moment they play. News production, for example, can involve bringing together and arranging a plethora of elements: live shots, recorded video, graphics, captions (via character generators), teleprompter content, camera movements, audio feeds, etc. The newsroom edits, stores, combines, and plays back the various program elements to create a finished program. The program can be transmitted to viewers via traditional over-the-air broadcast techniques and/or can be distributed as streaming video to computing devices, e.g., via the Internet.

BRIEF DESCRIPTION OF THE DRAWINGS

FIG. 5 is a table diagram illustrating a table containing segment data in accordance with an embodiment of the technology.

DETAILED DESCRIPTION

Overview

Figure 1:
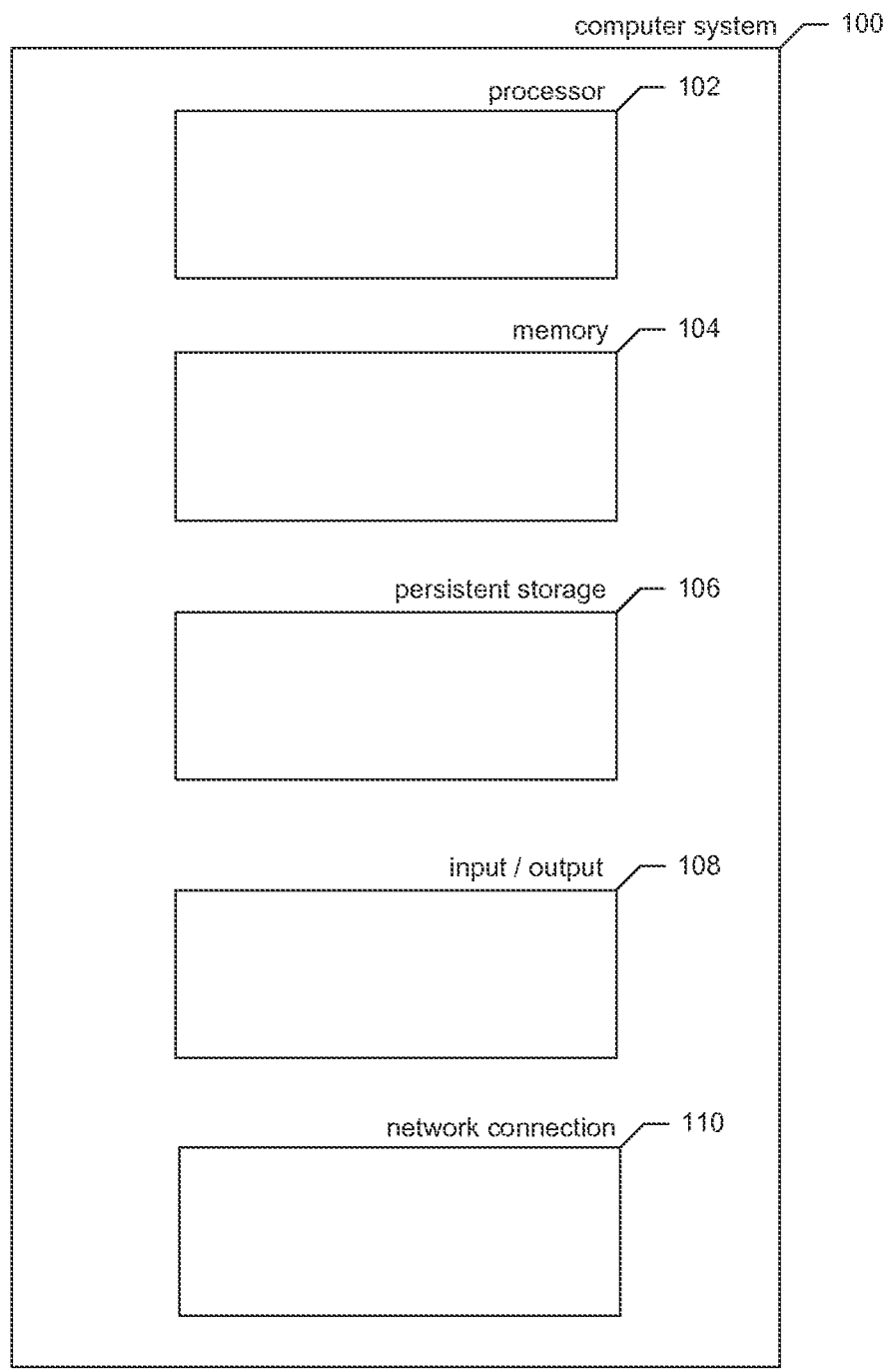
FIG. 1 is a block diagram showing some of the components typically incorporated in at least some of the computer systems and other devices on which the technology executes.

The present disclosure describes technology including systems and methods for automating the generation of links to individual stories within a video stream, such as stories during a live news program ("the technology"). The technology enables client viewing devices to display links to recently played and upcoming stories in a way that has not previously been possible. In various embodiments, a digital channel integration system ("fusion system") leverages internal television production system information to identify a currently playing story, transmits cue marker data to a video stream encoder, and serves story information to a client, enabling the client to display an appropriate link to the beginning of a story within a live video stream.

Various systems manage a program rundown, which specifies how a television show, broken down into segments, is time-encoded. For example, a large number of television news departments use the Associated Press® ("AP") Electronic News Production System® ("ENPS") or the Avid® iNEWS® newsroom management system. The inventors have realized a way to use such production system information to make live streams of television shows more useful and navigable by providing links to appropriate points within streaming video associated with a news show or other television program. In some embodiments of the present disclosure, the technology can be configured to provide links to stories that have aired during the past hour, and/or display upcoming stories ahead of their actual airing or streaming.

In addition to a production management system, the technology can communicate with an automation or synchronization system. For example, a Crispin NewsPlayX playback automation system provides information about what show segment is airing. In various embodiments, the technology uses such automation information to synchronize the video feed. By parsing data from both a production system and an automation system, and associating segment identifiers from each, the technology can determine what is playing at the start time of each segment and/or commercial break of a show.

In some embodiments, the technology includes an interface allowing video producers to add metadata to the information about a show or segment within a show. For example, the technology can enable a label to be added, e.g., to mark one or more segments as part of a larger series or into a "what you missed late last night" category. The technology also allows clips to be associated with related video (e.g., stored video-on-demand ("VOD") assets), stories, interactive media, advertisements, etc. The technology can be configured to use metadata to enable searching for and sharing of stories from a video stream.

By operating in some or all of the ways described above, the technology generates multiple sequence points tied to actual programming events of a show in a video stream, improving the utility of streaming by enabling viewers to easily navigate to the start of a story or clip and view information specifically related to the story or clip.

Description of Figures

FIG. 1 is a block diagram showing some of the components typically incorporated in at least some of the computer systems and other devices on which the technology executes. These computer systems and devices 100 may include one or more processors 102 such as central processing units ("CPUs") for executing computer programs; a computer memory 104 for storing programs and data—including data structures, database records, other data tables, etc.—while they are being used; a persistent storage device 106, such as a hard drive, for persistently storing programs and data, or a computer-readable media drive such as a USB flash drive, for reading programs and data stored on such a computer-readable medium; an input/output component 108 that can receive input, e.g., from a user via an input device, or provide output, e.g., via a screen or other output device; and a network connection 110 for connecting the computer system to other computer systems to exchange programs and/or data—including data structures—such as via the Internet or another network and its networking hardware, such as switches, routers, repeaters, electrical cables and optical fibers, light emitters and receivers, radio transmitters and receivers, and the like. The terms "memory" and "computer-readable storage medium" include any combination of temporary and/or permanent storage, e.g., read-only memory (ROM) and writable memory (e.g., random access memory or RAM), writable non-volatile memory such as flash memory, hard drives, removable media, magnetically or optically readable discs, nanotechnology memory, synthetic biological memory, and so forth, but do not include a propagating signal per se. In various embodiments, the technology can be accessed by any suitable user interface including Web services calls to suitable APIs. While computer systems configured as described above are typically used to support the operation of the technology, one of ordinary skill in the art will appreciate that the technology may be implemented using devices of various types and configurations, and having various components.

Figure 2:
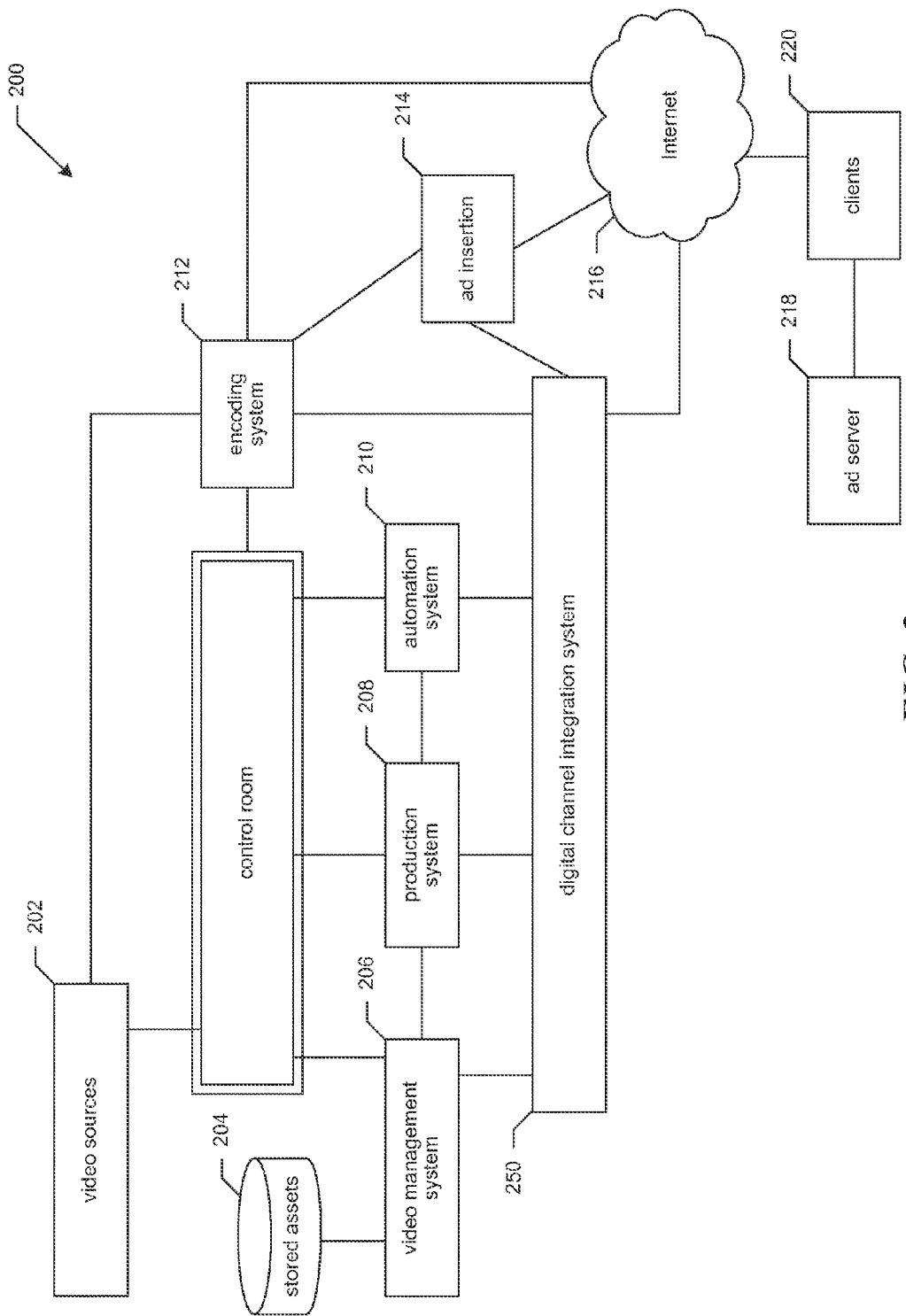
FIG. 2 is a high-level schematic diagram illustrating logical relationships among television production and video streaming systems in accordance with an embodiment of the technology.

FIG. 2 is a high-level schematic diagram illustrating logical relationships among television production and video streaming systems in accordance with an embodiment of the technology. Video sources 202 can include, for example, studio sources, external video feed sources, graphics elements, character generator overlays, etc. In the illustrated embodiment, a control room combines such sources 202 into a program to be broadcast and/or streamed. In addition, the control room is connected to a video management system 206 that manages stored assets 204, such as stored video clips that may be related to a particular subject; a production system 208, such as AP ENPS, that manages a show's rundown; and an automation system 210, such as Crispin NewsPlayX, that provides playback control and real-time information. The video management system 206, the production system 208, and the automation system 210 are also connected to a digital channel integration system 250. The digital channel integration system 250 collects information from the video management system 206, the production system 208, and the automation system 210 as further described below.

The digital channel integration system 250 is also connected to an encoding system 212. The encoding system 212 takes the raw video feed and encodes it for consumption in various video formats, which can include transcoding, transmuxing, etc. For example, the encoding system 212 can generate HTTP live streams in various formats, at various bit or key frame rates, as well as streaming formats for mobile devices and/or for "over the top" devices such as Internet television set-top boxes; and can generate an image (such as a thumbnail image) taken from or relating to the stream. In addition, the encoding system 212 can be configured to insert data into the video stream (or, e.g., into selected encoded streams), such as cue points or breakpoints in the stream provided by the digital channel integration system 250. In some embodiments, the encoding system 212 transmits a stream to an ad insertion system or service 214. For example, the ad insertion system or service 214 may insert advertising content specific to a stream configured for viewing on mobile devices, based on the cue points or breakpoints in the stream provided by the digital channel integration system 250.

The encoding system 212 (or, e.g., the ad insertion system or service 214, after inserting advertisements) can transmit the video stream via the Internet 216, such as to a client 220 via a content delivery network ("CDN"), e.g., Akamai® CDN servers. A client device 220 can then play the video stream and communicate via the Internet 216 with the digital channel integration system 250 to obtain information about stories or segments within the video stream and to navigate to a story within the video stream. In addition, based on the cue points or breakpoints in the stream and the information about a story or segment within the video stream provided by the digital channel integration system 250, the client device 220 can download and play, at the appropriate time, an advertisement from an ad server 218 tailored to both the program or segment and the client device 220.

Figure 3:
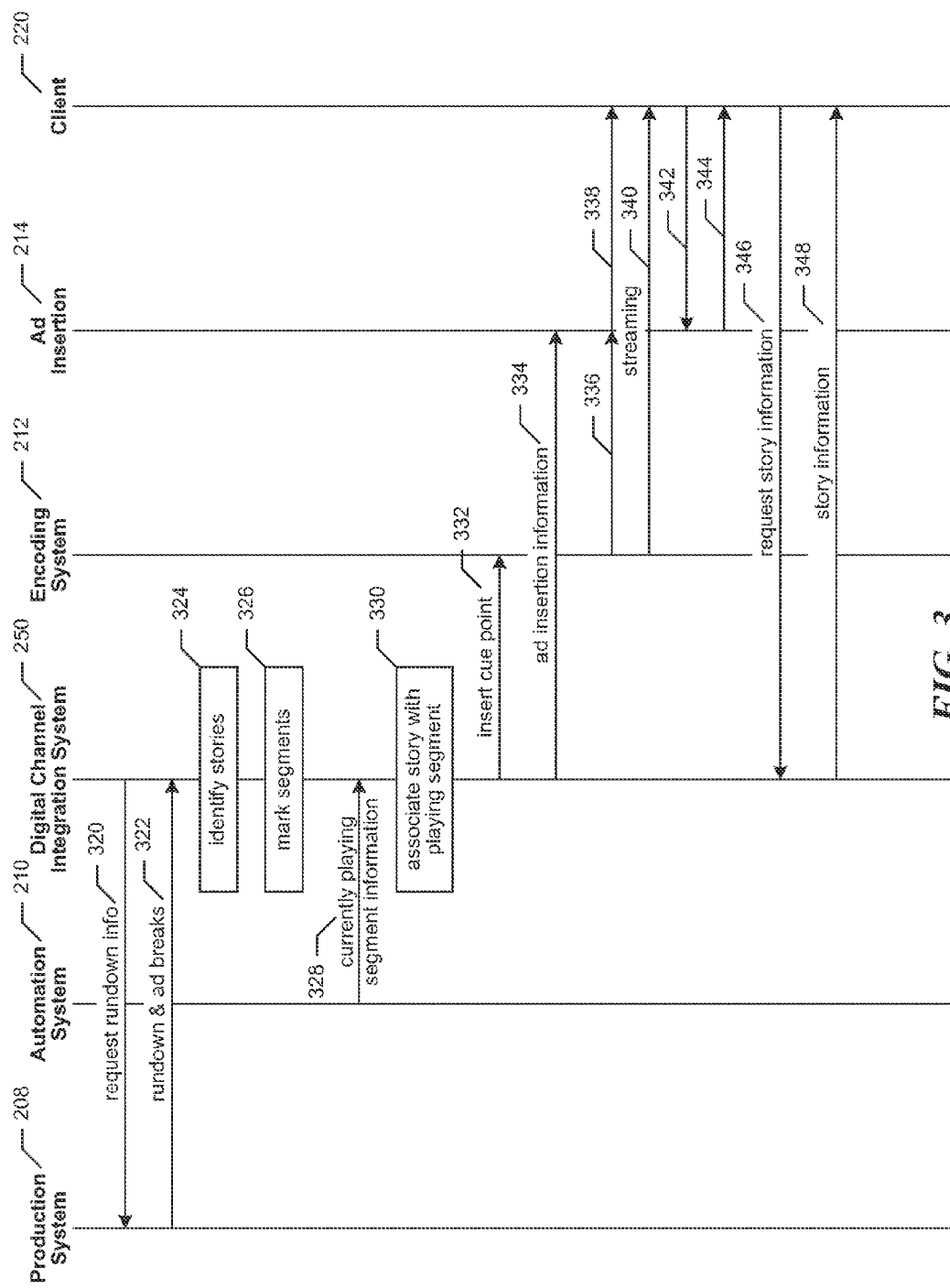
FIG. 3 is a sequence diagram illustrating digital channel integration system interactions in accordance with an embodiment of the technology.

FIG. 3 is a sequence diagram illustrating digital channel integration system interactions in accordance with an embodiment of the technology. In the illustrated example, a digital channel integration system 250 obtains segment information from a production system 208 and an automation system 210, combines and transforms the information, transmits data to an encoding system 212 and an ad insertion system or service 214, and communicates with a client 220 to enable the client to view and navigate among stories in the video stream.

In message 320, the digital channel integration system 250 requests rundown information from the production system 208. For example, the technology can draw out data from an AP ENPS system using Media Object System® ("MOS") language calls. In some embodiments of the present disclosure, the technology downloads production information to a database on a recurring basis, such as hourly or at the start of each segment. In message 322, the production system 208 delivers information to the digital channel integration system 250 including rundown and ad break information. For example, an AP ENPS system may provide extensible markup language ("XML")-formatted rundown data. In some embodiments, the production system 208 can be configured to push rundown information to the digital channel integration system 250, such as whenever the rundown changes.

In block 324, the digital channel integration system 250 parses the rundown information and identifies stories, e.g., multiple segments associated with the same story, such as described below in connection with FIG. 4. In block 326, the digital channel integration system 250 marks segments, such as by modifying the segment metadata. For example, the digital channel integration system 250 can add a prefix header to a segment identifier to indicate that the segment is part of a commercial break, or to indicate that the segment should be hidden after initial streaming so that no link is generated to that segment.

In message 328, the automation system 210 provides currently playing segment information to the digital channel integration system 250. In block 330, the digital channel integration system 250 associates a story with the currently playing segment. For example, the technology can correlate segment identifiers from the production system 208 in the automation system 210 (which may not be the same) to identify the segment to which both identifiers correspond. In message 332, the digital channel integration system 250 instructs the encoding system 212 to insert a cue point associated with a story, segment, or advertising break into one or more video streams. For example, the digital channel integration system 250 can prompt the encoding system 212 to mark the point in the video stream at which the current story begins.

In message 334, the digital channel integration system 250 transmits advertisement insertion information to the ad insertion system or service 214. For example, the digital channel integration system 250 can transmit information identifying an opportunity to stitch one or more ads into the video stream based on the ad block duration determined from the production system 208 information received in message 322. The ad insertion information 334 can be further based upon, for example, the program, the story, and/or the individual segment airing on either side of the advertising block. In some embodiments, the technology allows individual stories or segments of the program to be sponsored, enabling specific control of what advertisements are or are not placed in a particular stream to be delivered to a particular device or class of devices. In some embodiments, the message 334 includes or is formatted as a digital program insertion cueing message for cable ("ANS1/SCTE 35") message.

In messages 336 and 338 or 340, the encoding system 212 streams video to the client 220. In message 336, the encoding system 212 streams video to the ad insertion system or service 214, which can inject or replace an advertising block and send the stream on to the client 220 in message 338. In message 340, by contrast, the encoding system 212 streams video directly to the client 220. In message 342, the client device 220 requests an appropriate advertisement for displaying at an appropriate breakpoint in video stream, and in message 344, the ad insertion system or service 214 provides an ad for client-side insertion.

In message 346, the client 220 requests story information from the digital channel integration system 250. For example, the client 220 may request updated information about upcoming stories or information about the currently playing story. In message 348, the digital channel integration system 250 provides story information to the client 220. For example, the story information can include story name, timing information, a thumbnail image to visually represent the story in a digital video recorder ("DVR")-style listing, a pointer or other link (such as a uniform resource locator ("URL")) to enable user to jump to the story within the video stream, one or more links to related stored assets (e.g., related video clips), etc. In some embodiments, the digital channel integration system 250 provides such story information in a JavaScript Object Notation ("JSON") format. In some embodiments, the digital channel integration system 250 pushes information directly to the client 220. In some embodiments, the technology embeds story information within the video stream, so that the client 220 can obtain some or all of the story information directly from the video stream without separately requesting that story information from the digital channel integration system 250.

Figure 4:
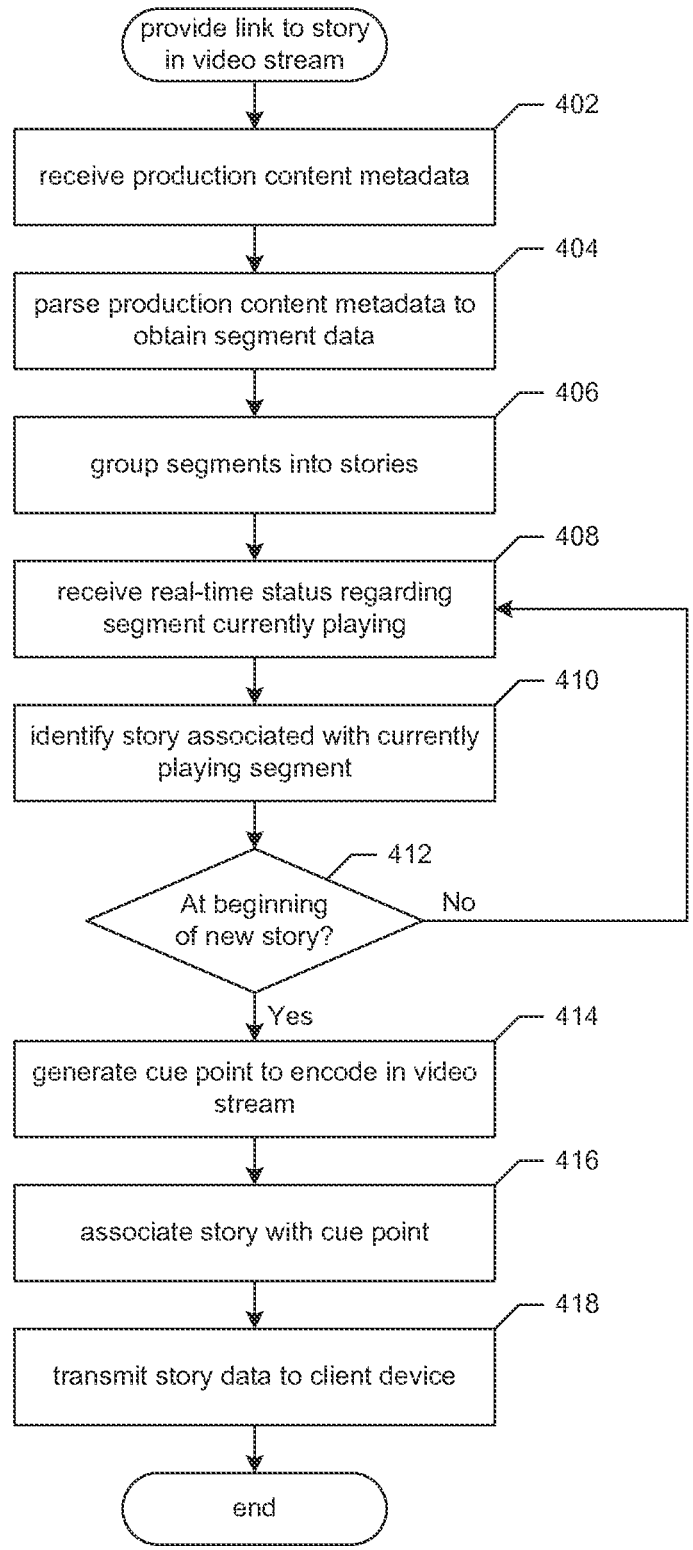
FIG. 4 is a flow diagram illustrating steps for a server device to provide a link to a story within a video stream in accordance with an embodiment of the technology.

FIG. 4 is a flow diagram illustrating steps for a server device to provide a link to a story within a video stream in accordance with an embodiment of the technology. Providing streaming video typically does not involve identifying programs, stories, or segments within a live stream. The disclosed technology, on the other hand, enables enhancing a live stream by providing links to stories in a video stream as they appear. In step 402, the technology receives production content metadata, e.g., from a production system 208 as described above. In step 404, the technology parses the production content metadata to obtain segment data. Such segment data can include, for example, an event ID, a story slug, a sequence ID, a rundown ID, segment start and end times and/or duration, etc. In step 406, the technology groups segments into stories. For example, the technology can compare the story slugs of two segments, and if they match, assign them to or determine that they are associated with the same story.

In step 408, the technology receives real-time status information identifying a currently playing segment. For example, such information can be received from an automation or synchronization server 210 as described above. In some embodiments, the technology uses information about a currently playing segment to determine information about a previously playing segment; for example, ascribing the start time of the currently playing segment as the end time of the previous segment. In step 410, the technology identifies a story associated with the currently playing segment. In some embodiments, the technology creates a mapping between segment identifiers used by a system that provides production content metadata and segment identifiers used by system that provides currently playing segment information, such as a lookup table or other data structure, and references the mapping to identify the story associated with the currently playing segment.

In decision block 412, the technology determines whether the currently playing segment is the beginning of a new story. By doing so, the technology can ensure that links are generated only at appropriate points in the video stream. If the currently playing segment is part of an already-playing story, the process continues by returning to step 408 (until the next segment begins). If, on the other hand, the currently playing segment is at the beginning of a new story, then the process continues in step 414.

In step 414, the technology generates a cue point to encode in the video stream. In some embodiments, the technology prompts an encoding system to insert a cue point identifying, for example, an ad break of a particular duration, or a particular story. In step 416, the technology associates the story with the key point, e.g., by saving the cue point information in a data structure containing metadata associated with the story. In step 418, the technology transmits story data to a client device. For example, the client device may request story data associated with a particular cue point, and the technology can reply with data that the client device can use to display information about, and provide a link to, the story in the video stream.

Those skilled in the art will appreciate that the steps shown in FIG. 4 and the other flow diagrams herein may be altered in a variety of ways. For example, the order of the steps may be rearranged; some steps may be performed in parallel; shown steps may be omitted, or other steps may be included; etc.

FIG. 5 is a table diagram illustrating a table 500 containing segment data in accordance with an embodiment of the technology. In the illustrated example, each row in the table 500 contains a segment identifier column 502, a story identifier column 504, a story slug column 506, a related assets column 508, a link URL column 510, a thumbnail column 512, and a sponsor column 514. In the illustrated example, row 516 identifies a segment having ID 1010, which is part of a story having ID number 72 and the story slug "new discovery." Row 516 indicates that the segment has a related video clip having reference number A113. Row 516 also contains a link URL for a client device to navigate to the segment or story, and a thumbnail image for the client device to display in connection with the story. In addition, row 516 indicates that ABC Corporation is a sponsor of the segment or story, so that the technology can direct an advertising insertion engine to insert only appropriate advertisements.

Although FIG. 5 presents one example of a suitable information table, those skilled in the art will appreciate that the technology can use tables having different, fewer, and/or greater numbers of columns, as well as a larger number of rows. Although the contents and organization of the table 500 are designed to make them more comprehensible by a human reader, those skilled in the art will appreciate that actual data structures used by the present technology to store this information can differ from the table shown. For example, they can be organized in a different manner (e.g., in multiple different data structures); can contain more or less information than shown; can be compressed and/or encrypted; etc.

Figure 6:
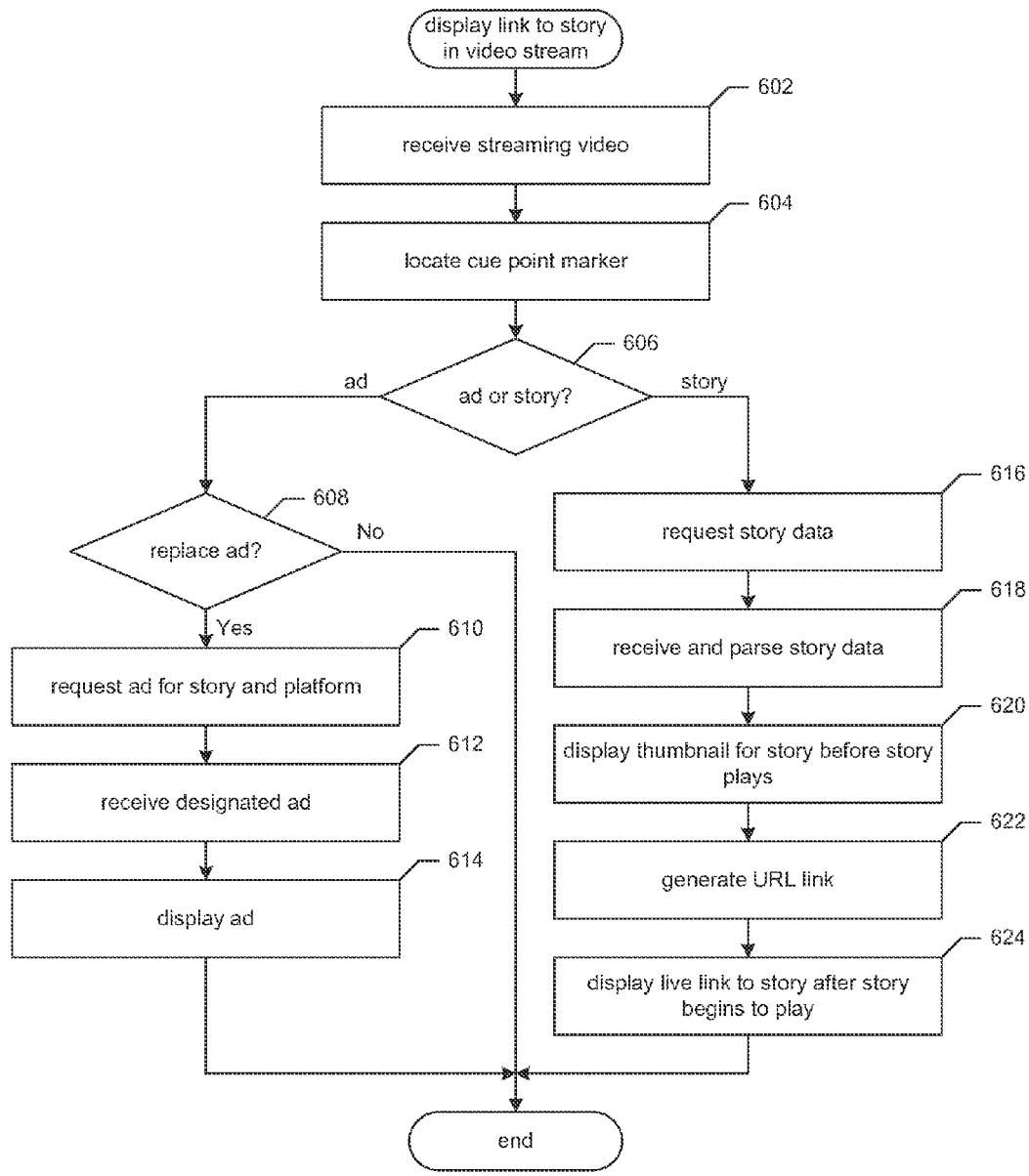
FIG. 6 is a flow diagram illustrating steps for a client device to display a link to a story within a video stream in accordance with an embodiment of the technology.

FIG. 6 is a flow diagram illustrating steps for a client device to display a link to a story within a video stream in accordance with an embodiment of the technology. Viewing a stream using conventional techniques typically involves watching currently live programming without the ability to rewind or restart the stream at a known point; if going back is possible, it typically involves blindly selecting an earlier time in the stream. Looking for a previously aired story is cumbersome. The disclosed technology, on the other hand, supports displaying information about already-aired and upcoming stories in a video stream, and providing convenient links to the beginnings of individual aired stories within the video stream.

In step 602, the client device receives a video stream. In step 604, the technology locates a cue point marker within the video stream. In decision block 606, the technology determines whether the cue point marker is for an advertising break or for a new story. If the cue point marker indicates an advertising break, then in decision block 608, the technology determines whether to insert (or replace) an advertisement for the advertising break. For example, a mobile device may not be configured to perform local ad insertion, and in that case an appropriate ad may already have been inserted (e.g., by the ad insertion system or service 214 of FIG. 2.) If the technology determines not to insert or replace and ad, then these steps end. If, however the technology determines that an ad should be inserted, the process continues in step 610. In step 610, the technology requests an advertisement tailored to the currently playing story and the client platform. For example, if a story or segment is sponsored, the technology can determine from the identity of the cue point marker what advertisements are and are not appropriate for displaying on the client device. In step 612, the technology receives the designated advertisement, and in step 614, the technology displays the advertisement during the advertising break.

Returning to decision block 606, if the cue point marker indicates a new story, then the process continues to step 616. In step 616, the technology requests story data, e.g., from a digital channel integration system 250. In some embodiments, the technology prompts the client device to poll the digital channel integration system 250 at regular intervals such as every minute or every ten seconds to detect whether new story data is available. In some embodiments, the digital channel integration system 250 inserts a message into the video stream prompting the client device to request new story data. In some embodiments, the digital channel integration system 250 pushes new story data to the client device when it is available. In step 618, the technology receives and parses the story data. In the illustrated example, the story data includes, among other data, a thumbnail image associated with the story, and information for generating a URL link to an appropriate point in the video stream. In step 620, the technology displays a thumbnail for the story. In the illustrated embodiment, the client device can display the thumbnail and information about an upcoming story even before the story plays live in the video stream. In step 622, the technology generates a URL link to a point in a video stream at which the story begins. In step 64, the technology displays a live link to the story after the video stream begins to play the story.

Conclusion

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited except as by the appended claims.

We claim:

1. A method for automatically providing navigation links to appropriate points within streaming video associated with a television program, the method comprising:
   receiving, at a digital channel integration system, production content metadata of the television program from a production system used to produce the television program;
   parsing, by a processor of the digital channel integration system, the production content metadata to obtain segment data for a plurality of segments of the television program, wherein the segment data for each segment includes a segment identifier, at least one time code, and a story slug indicating an identifier for a story associated with each of the plurality of segments;
   grouping, based on the time codes and the story slugs, adjacent segments having matching story slugs into one or more stories;
   encoding, by an encoding system, a raw video associated with the television program into a video stream suitable for transmission over a computer network to a client device;
   receiving, during playback of the video stream on the client device, real-time status information that includes an identifier of a playing segment;
   determining, based on the segment data and the real-time status information, a story associated with the playing segment;
   determining that the playing segment corresponds to a beginning of a new story having a different story slug than a previously played segment immediately before the playing segment;
   responsive to determining that the playing segment corresponds to the beginning of the new story, transmitting information to prompt the encoding system to insert a cue point marker for the story in the video stream; and
   storing an indicator for the cue point marker for the story in association with the segment data.

2. The method of claim 1, further comprising transmitting, to the client device, a feed of data associated with the story, including a pointer for the client device to play the video stream from the beginning of the story.

3. The method of claim 2 wherein the transmitting is in response to receiving, from the client device, a request for data associated with the cue point marker for the story, or is a push communication to one or more client devices.

4. The method of claim 2 wherein transmitting the feed of data associated with the story comprises transmitting a story name, a Uniform Resource Locator ("URL") link to the story in the video stream, and a thumbnail image.

5. The method of claim 1 wherein receiving production content metadata of the television program comprises prompting a computing server to provide production information via a Media Object Server ("MOS") communication protocol.

6. The method of claim 1 wherein receiving the real-time status information comprises receiving clip playback data including a segment start time.

7. The method of claim 2, further comprising receiving information associating a segment or story with a stored asset, and wherein transmitting the feed of data associated with the story comprises transmitting a link to the stored asset.

8. The method of claim 7 wherein the stored asset is a related video clip.

9. The method of claim 1, further comprising transmitting, to a client device, a feed of data associated with a scheduled story before the story plays.

10. The method of claim 2, further comprising:
receiving label metadata of the television program;
assigning the story to a story category, based on the label metadata; and
wherein transmitting, to a client device, the feed of data associated with the story includes transmitting the story category.

11. The method of claim 1 wherein the playing segment is an advertisement block, such that:
determining the story associated with the playing segment comprises identifying a commercial break; and
wherein transmitting the information comprises inserting a cue point insertion marker indicating a commercial break.

12. The method of claim 11, further comprising transmitting an ANS1/SCTE-35 message identifying an advertisement insertion opportunity including a start point and a duration or end point.

13. The method of claim 11, further comprising:
receiving sponsor metadata of the television program; and
transmitting, to an advertisement insertion computing device, information designating one or more advertisements as required or disallowed during the commercial break, based on the sponsor metadata.

14. The method of claim 13 wherein the sponsor metadata comprises sponsorship for a particular segment.

15. A system for automatically providing navigation links to appropriate points within streaming video associated with a television program, the system comprising:
a processor; and
a non-transitory computer-readable storage medium storing instructions that when executed by the processor cause the processor to:
receive, at a digital channel integration system, production content metadata of the television program from a production system used to produce the television program;
parse the production content metadata to obtain segment data for a plurality of segments of the television program, wherein the segment data for each segment includes a segment identifier, at least one time code, and a story slug indicating an identifier for a story associated with each of the plurality of segments;
group, based on the time codes and the story slugs, adjacent segments having matching story slugs into one or more stories;
encoding, by an encoding system, a raw video associated with the television program into a video stream suitable for transmission over a computer network to a client device;
receive, during playback of the video stream on the client device, real-time status information that includes an identifier of a playing segment;
determine, based on the segment data and the real-time status information, a story associated with the playing segment;
determine that the playing segment corresponds to a beginning of a new story having a different story slug than a previously played segment immediately before the playing segment;
responsive to determining that the playing segment corresponds to the beginning of the new story, transmit information to prompt the encoding system to insert a cue point marker for the story in the video stream; and
store an indicator for the cue point marker for the story in association with the segment data.

16. The system of claim 15, wherein the instructions when executed further cause the processor to transmit, to the client device, a feed of data associated with the story, including a pointer for the client device to play the video stream from the beginning of the story.

17. A non-transitory computer-readable storage medium storing instructions for automatically providing navigation links to appropriate points within streaming video associated with a television program, the instructions when executed by the processor causing the processor to:
receive, at a digital channel integration system, production content metadata of the television program from a production system used to produce the television program;
parse the production content metadata to obtain segment data for a plurality of segments of the television program, wherein the segment data for each segment includes a segment identifier, at least one time code, and a story slug indicating an identifier for a story associated with each of the plurality of segments;
group, based on the time codes and the story slugs, adjacent segments having matching story slugs into one or more stories;
encoding, by an encoding system, a raw video associated with the television program into a video stream suitable for transmission over a computer network to a client device;
receive, during playback of the video stream on the client device, real-time status information that includes an identifier of a playing segment;
determine, based on the segment data and the real-time status information, a story associated with the playing segment;
determine that the playing segment corresponds to a beginning of a new story having a different story slug than a previously played segment immediately before the playing segment;
responsive to determining that the playing segment corresponds to the beginning of the new story, transmit information to prompt the encoding system to insert a cue point marker for the story in the video stream; and
store an indicator for the cue point marker for the story in association with the segment data.

18. The non-transitory computer-readable storage medium of claim 17, wherein the instructions when executed further cause the processor to transmit, to the client device, a feed of data associated with the story, including a pointer for the client device to play the video stream from the beginning of the story.

* * * * *